United States Patent [19]

Tsunoi

[11] 4,006,086
[45] Feb. 1, 1977

[54] APPARATUS FOR REMOVAL OF OIL FILMS FROM WATER

[75] Inventor: Ikuo Tsunoi, Yokohama, Japan

[73] Assignee: Kabushiki-Kaisha Kyoei Senpaku Kogyo, Yokohama, Japan

[22] Filed: May 14, 1975

[21] Appl. No.: 577,554

[30] Foreign Application Priority Data

July 1, 1974 Japan .............................. 49-75217

[52] U.S. Cl. ..................... 210/242 R; 210/DIG. 25
[51] Int. Cl.² ....................................... E02B 15/04
[58] Field of Search .............. 210/83, 242, DIG. 21

[56] References Cited
UNITED STATES PATENTS

| | | | |
|---|---|---|---|
| 3,615,017 | 10/1971 | Valdespino | 210/DIG. 21 |
| 3,707,232 | 12/1972 | Harrington et al. | 210/242 |
| 3,760,944 | 9/1973 | Bell et al. | 210/DIG. 21 |
| 3,800,951 | 4/1974 | Mourlan | 210/242 |
| 3,804,251 | 4/1974 | Farrell et al. | 210/242 |
| 3,823,828 | 7/1974 | Derzhavers et al. | 210/DIG. 21 |
| 3,847,815 | 11/1974 | Bajnis | 210/242 |
| 3,853,767 | 12/1974 | Mohn | 210/DIG. 21 |
| 3,875,062 | 4/1975 | Rafael | 210/242 |
| 3,890,234 | 6/1975 | Galicia | 210/242 |

Primary Examiner—Theodore A. Granger

[57] ABSTRACT

An apparatus in the provision of a number of vertical holes, for separation and rectification of the oil and water, bridging between a barrier or dam section and an associated weir whereby the oil layer is guided into the innermost upper part of a chamber formed ahead of said dam section along a guide plate while water passes over said weir and flows into the lower section of said chamber past through said vertical holes, and both of the oil and water are thereafter sucked up by respective sucking means separately.

2 Claims, 2 Drawing Figures

APPARATUS FOR REMOVAL OF OIL FILMS FROM WATER

BACKGROUND OF THE INVENTION

This invention relates to a device for recovery aboard a ship of oil floating on the surface of the water such as river, harbour, ocean and so forth while separating the oil from water.

In a conventional method for recovery of oil from the surface of the water by means of an oil dam hung down between the two fuselages of a twin-fuselage ship, a principal problem has been that a large amount of water is sucked up together with the oil to result in ineffectiveness of the oil recovery as the oil layer floating on the surface of water is agitated and mixed with water because of a turbulent flow generated when the oil layer flows into the oil dam.

An object of the present invention is therefore directed to provide a floating oil recovery device which prevents the agitation and mixing of the oil with water at the time when the oil layer floating on the surface of the water flows into the oil dam, and also makes it possible to recover the oil in an extremely high purity.

SUMMARY OF THE INVENTION

The present invention features essentially in the provision of a number of vertical holes, for separation and rectification of the oil and water, bridging between a barrier or dam section and an associated weir whereby the oil layer is guided into the innermost upper part of a chamber formed ahead of said dam section along a guide plate while water passes over the weir and flows into the lower section of said chamber past through the vertical holes, and both of the oil and water are thereafter sucked up by respective sucking means separately.

DESCRIPTION OF THE PREFERRED EMBODIMENTS

Figure 1:
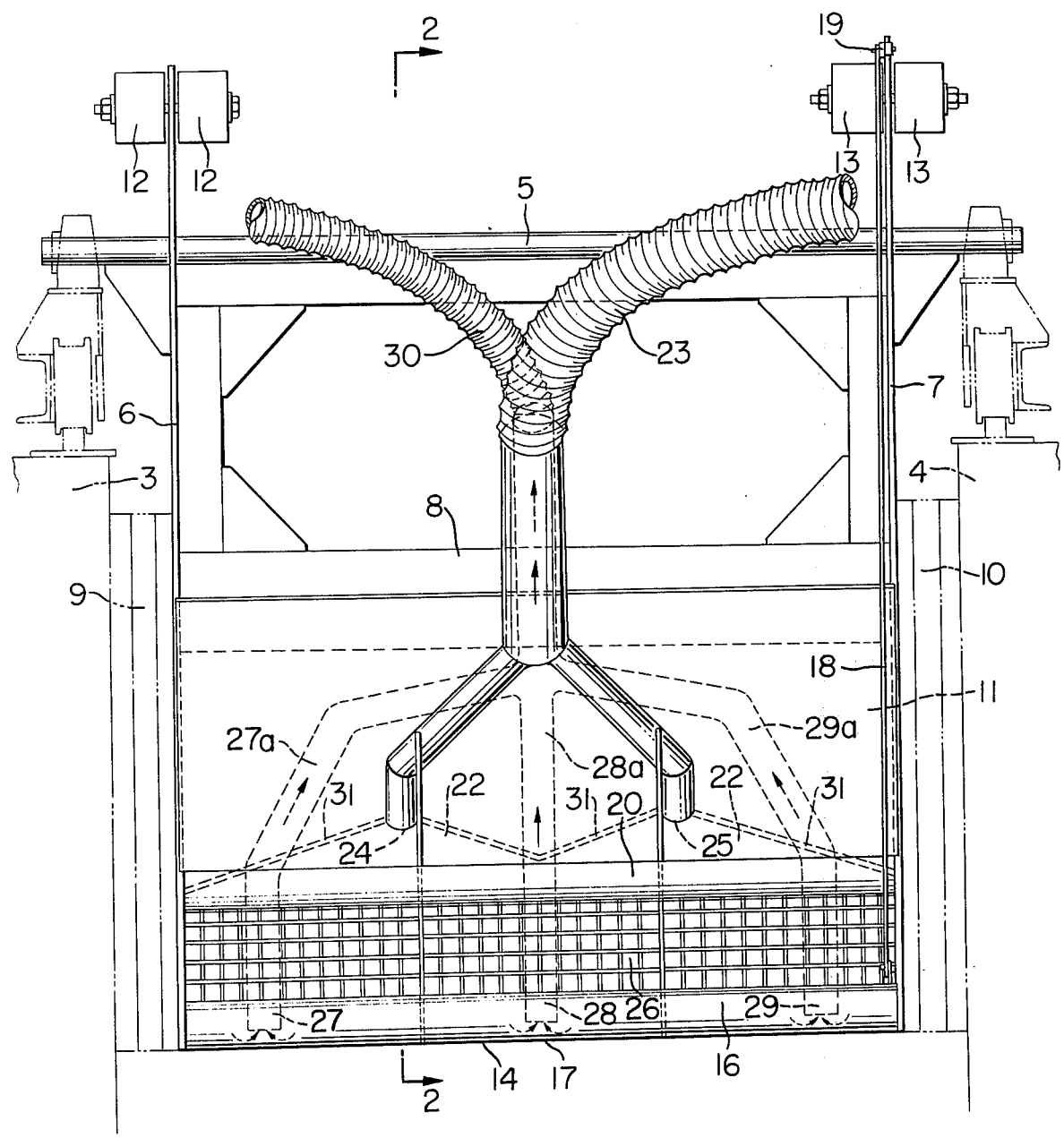
FIG. 1 is a front view looking from the aslant above.
Figure 2:
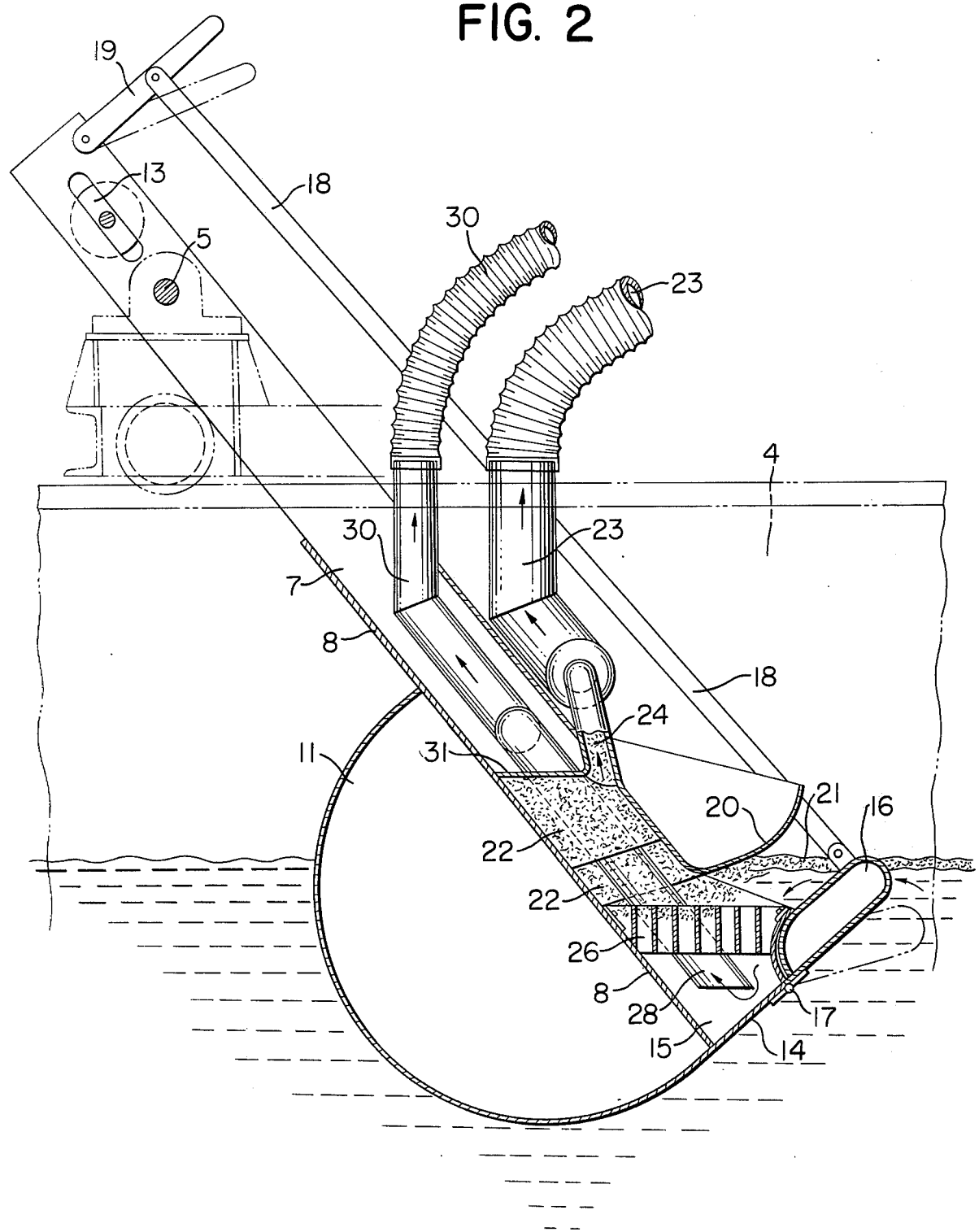
FIG. 2 is a vertical sectional view along the line 2—2 indicated in FIG. 1.

A support rod 5 is spanned between two fuselages 3 and 4 of a twin-fuselage ship. To the support rod 5 is hung down a dam section 8 via a pair of arms 6 and 7 to be capable of swinging freely. Spacer boards 9 and 10, being made of a rigid rubber, project both sides of said dam section 8 respectively and fill up the slits formed respectively between both sides of the dam section 8 and the two fuselages 3 and 4, whereby the passage of the oil behind the dam section past thereover is prevented. A float 11 having adjustable buoyancy is provided to the lower surface at the lower end section of the dam section 8, and each of balance weights 12 and 13 is fitted to the upper edge of each of said pair of arms 6 and 7. A bottom plate 14 is placed between the lower edge section of each of said pair of arms 6 and 7, and also connects the lower edge of the dam section 8 so as to thereby define a chamber, that is to say, a water tank 15. A weir 16 is connected to the bottom plate 14 foldably by means of a hinge 17, and is operable aboard the ship through a link 18 and a lever 19. Though the weir 16 may as well be made of a wood, it has advantageously a float-shape as shown in the figures, because buoyancy takes part in floating the weir 16 upwards automatically. In this case, manipulation of the lever 19 is necessary only when the weir is required to be pushed down.

An oil guide plate 20 is adapted at an upward position of the weir 16 so as to project ahead of the dam section 8, and functions to guide an oil layer 21 passing over the weir 16 into a chamber 22 defined at the innermost part of the dam section along the lower surface of the weir. Oil suction ports 24 and 25 of an oil suction passage 23 are open downwards at the upper section of the chamber 22, and the oil is sucked up through said passage by an oil suction pump which is not shown in the figures. The chamber 22 as an oil basin is formed at a position a little higher than the level of the water in order to allow the elevation of the oil having a specific gravity smaller than that of water, but prevent the elevation of water, and enhances the purity of oil to be recovered.

A number of vertical holes 26 are bored in between the dam section 8 and the weir 16. Water passing over the weir 16 easily falls downward past through these vertical holes 26 into the chamber formed therebelow, to wit, into the water tank 15, since specific gravity of water is larger than that of the oil. The oil flowing into the vertical holes 26, on the other hand, floats upward in the holes but hardly falls downward, because it is lighter than water. For these reasons, the oil is scarcely involved and admixed with water deep into the water tank 15 even when a velocity of the liquid passing over the weir 16 is considerably high. Thus the oil floats upward with a number of vertical holes 26 as its boundary while water stays therebelow to thereby effect separation and rectification between the oil and water.

Inside the water tank 15, there are provided water suction ports 27, 28 and 29 at a possible lowest portion of the tank. The openings of these ports 27, 28 and 29 are connected past through respective branching passages 27a, 28a and 29a to a main passage 30 for a pressure connection with a water sucking pump of a large capacity (not shown) to suck up water flowing into the water tank 15.

In the embodiment shown in the figure, an oblique plate 31 to form the chamber 22 as the oil basin is shown as a fixed-type. However, the oblique plate 31 may also be made of a material such as a rubber which can be displaceable in a vertical direction so that the positioning thereof can be adjusted from the above. At the initial state of the oil-sucking operation or when the oil layer is considerably thin, the oblique plate 31 is maintained at a level not so much high but only slightly high. As the oil layer becomes thicker, the oblique plate 31 is pulled upward gradually so as to enlarge the capacity of the chamber 22 as the oil basin. By this arrangement, occurrence of cavitation is eliminated when the oil layer is thin, and invasion of the oil layer into the water tank 15 is prohibited when the oil layer is thick. Thus, sucking of only the oil layer is ensured very smoothly.

The mode of operation of the present device is as follows.

The dam section 8 is first launched down to the level of the water by proper means whereupon the lower section of the dam section 8 is floated up by the action of the float 11. Next, the level of the dam section 8 is adjusted by controlling the balance weights 12 and 13 as well as the buoyancy of the float 11 by means of an electromagnetic valve (not shown) so that the upper periphery of the weir 16 appears and disappears from the level of the water. Subsequently, the lever 19 is pushed forward so as to thereby push down the weir 16 via the link 18 whereupon water flows into a number of vertical holes 26, and the oil layer 21 likewise flows there-into along with the inflow of water.

As the water tank 15 is empty at the beginning, the oil and water drop into the tank 15 in the state of admixture for a while, but the oil soon floats up into the upper layer and separates from water. By driving then the water suction pump as well as the oil suction pump (not shown), negative pressure is applied respectively to the water suction ports 27, 28 and 29, and the oil suction ports 24 and 25, and a large amount of water is sucked from the former while the oil is sucked up by the latter.

While adjusting the weir 16 vertically by the lever 19, the oil and water are supplied continuously, and after a short while, they are separated from each other and sucked up separately. In other words, the oil layer 21 is guided into the dam section by the inflow of water as a conveyor.

As heretofore noted, the present device has a large number of vertical holes 26 provided inside the dam section in order to prevent the occurrence of a turbulent flow inside the dam section as much as possible, and to separate the oil from water into the upper and lower layers respectively. Meanwhile the oil suction ports 24 and 25 are located at a position relatively higher than the level of the water so as to prevent the suction of water which is heavier than the oil. By these combined arrangements, the oil can be recovered in an extremely high purity accurately and continuously.

I claim:

1. Apparatus for collecting light liquid from the surface of a body of water, said apparatus comprising an elongate chamber vertically arranged between the fuselages of a twinfuselage ship, an upper end of said chamber pivotably supported for swing movement in a direction parallel to an elongate axis of the fuselages with the lower end provided with float means for floatable support on the surface of water, inlet opening means in the lower end of the chamber in the direction of swinging movement, weir means pivotably connected to the lower edge of said inlet opening constructed and arranged to provide an adjustable lower edge for said inlet opening; horizontal plate means defining the upper edge of said inlet opening, said plate being inclined upwardly in the direction faced by said inlet opening and being spaced above said weir means, a perforate plate horizontally arranged within said chamber near the bottom thereof, pump and conduit means for removing water from said chamber, an inlet end of said conduit being located in said chamber beneath said perforate plate above the bottom of the chamber, pump and conduit means for removing oil from said chamber, an inlet end of said conduit being located in said chamber above the perforate plate and beneath the upper end of said chamber.

2. An apparatus as defined in claim 1, further comprising means associated with said weir means to adjust said weir means in a vertical direction with respect to the surface of the body of water.

* * * * *